United States Patent
Xiao et al.

(10) Patent No.: US 12,023,758 B2
(45) Date of Patent: Jul. 2, 2024

(54) METHOD AND SYSTEM FOR LASER ADDITIVE MANUFACTURING BASED ON KEYHOLE EFFECTS

(71) Applicant: BEIJING UNIVERSITY OF TECHNOLOGY, Beijing (CN)

(72) Inventors: Rongshi Xiao, Beijing (CN); Ting Huang, Beijing (CN); Qiang Wu, Beijing (CN); Jianglin Zou, Beijing (CN); Jiejie Xu, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 482 days.

(21) Appl. No.: 16/962,708

(22) PCT Filed: Jan. 8, 2019

(86) PCT No.: PCT/CN2019/070902
§ 371 (c)(1),
(2) Date: Jul. 16, 2020

(87) PCT Pub. No.: WO2019/141115
PCT Pub. Date: Jul. 25, 2019

(65) Prior Publication Data
US 2020/0346303 A1 Nov. 5, 2020

(30) Foreign Application Priority Data
Jan. 18, 2018 (CN) .......................... 201810047415.2

(51) Int. Cl.
*B23K 26/342* (2014.01)
*B33Y 10/00* (2015.01)
*B33Y 30/00* (2015.01)

(52) U.S. Cl.
CPC ............. *B23K 26/342* (2015.10); *B33Y 10/00* (2014.12); *B33Y 30/00* (2014.12)

(58) Field of Classification Search
CPC ........ B23K 26/342; B33Y 10/00; B33Y 30/00
See application file for complete search history.

(56) References Cited

U.S. PATENT DOCUMENTS

| | | | |
|---|---|---|---|
| 2004/0182844 A1* | 9/2004 | Clark | B23K 35/0216 219/121.85 |
| 2014/0116999 A1* | 5/2014 | Suzuki | B23K 9/173 219/130.21 |

(Continued)

FOREIGN PATENT DOCUMENTS

| CN | 102015193 A | 4/2011 |
|---|---|---|
| CN | 104551391 A | 4/2015 |

(Continued)

OTHER PUBLICATIONS

Machine translation of CN104551391 (Year: 2015).*
International Search Report for PCT/CN2019/070902, mailed Mar. 21, 2019.

*Primary Examiner* — Nathaniel E Wiehe
*Assistant Examiner* — Keith Brian Assante
(74) *Attorney, Agent, or Firm* — Andrus Intellectual Property Law, LLP

(57) ABSTRACT

Provided is a method for laser additive manufacturing based on keyhole effects. A welding wire and a laser beam are arranged, at certain angles, on two sides of a normal line of a substrate respectively. The laser beam is applied on the welding wire to generate a deep penetration melting keyhole. The welding wire absorbs energy of the laser beam and is heated and melted in a deep penetration melting mode. The welding wire transmits energy to a surface of the substrate to form a cladding layer. The laser beam irradiates the surface of the substrate after passing through the welding wire, and preheats the surface of the substrate in a heat conduction mode.

12 Claims, 2 Drawing Sheets

(56) References Cited

U.S. PATENT DOCUMENTS

2017/0304923 A1* 10/2017 Ash .................. B23K 26/60
2017/0368637 A1* 12/2017 Giese ................ B23K 26/211
2018/0154443 A1*  6/2018 Milshtein .......... B29C 64/393

FOREIGN PATENT DOCUMENTS

| CN | 106001823 A | 10/2016 |
| CN | 107414302 A | 12/2017 |
| CN | 107414303 A | 12/2017 |
| CN | 107538134 A |  1/2018 |
| JP | 2008093718 A |  4/2008 |

* cited by examiner

METHOD AND SYSTEM FOR LASER ADDITIVE MANUFACTURING BASED ON KEYHOLE EFFECTS

CROSS-REFERENCE TO RELATED APPLICATION

This application is a US National Phase Application of PCT patent application No. PCT/CN2019/070902 filed on Jan. 8, 2019, claiming priority to Chinese Patent Application No. 201810047415.2, filed on Jan. 18, 2018, the disclosure of which are incorporated herein by reference in entirety.

TECHNICAL FIELD

The present disclosure relates to a method and system for laser additive manufacturing based on keyhole effects and belong to the field of advanced manufacturing technology.

BACKGROUND

As a kind of advanced manufacturing technology, laser additive manufacturing has the advantages of low energy consumption, short flow, integration of forming and property control and etc. Laser additive manufacturing has gradually realized laser rapid prototyping manufacturing and laser direct additive manufacturing since its development in 1980s. Laser additive manufacturing has changed the forming and processing mode of traditional metal parts, especially the parts with high performance and complex configuration. Because of its high utilization rate of materials, short manufacturing cycle and excellent performance of formed parts, laser additive manufacturing is widely used in aerospace, shipbuilding and other fields.

Laser additive manufacturing can be divided into two categories according to the different states of metal materials during forming, one is represented by selective laser melting (SLM), in which powder is pre-laid before metal powder deposition; and the other is represented by direct metal deposition, in which the material is sent into the melting pool in real time in the metal material deposition process.

Selective laser melting (SLM) is a technology that scans the pre-laid metal powder with a high-energy laser beam according to the predetermined scanning path to melt it completely, and then cools and solidifies it for formation. Compared with traditional machining, the greatest advantage of SLM technology is that it can form complex shape parts, and secondly it can manufacture small batch of parts within a certain volume range rapidly. But its manufacturing cost is directly proportional to the processing time. Therefore, when forming large parts, the processing cost will greatly increase due to the increase of processing time. At the same time, the selective laser melting technology has strict requirements on the processing conditions, and its processing needs to be completed in the vacuum chamber, which limits its development in practical production.

Compared with selective laser melting, there are two main ways of laser melting deposition, one is synchronous powder feeding, the other is wire feeding. In the process of powder feeding laser additive manufacturing, the metal powder is used as the raw material, the high-energy laser is used as the energy source, according to the predetermined processing path, the metal powder that is fed synchronously is melted, solidified and deposited layer by layer, so as to realize the direct manufacturing of metal parts. The parts formed by this method have good compactness, but due to the interaction between laser and powder, the laser energy is attenuated, so the effective utilization rate of energy is low. At the same time, not all the fed powder enters the melting pool, resulting in low deposition efficiency of the powder feeding additive manufacturing. For example, W. Syed et al. studied the influence of different process parameters on the deposition efficiency of 316L stainless steel powder. The powder deposition efficiency increased with the increase of power, and the average deposition efficiency was about 0.21 kg/(H·kW) (W. Syed, Pinkerton A J, Li L. A comparative study of wire feeding and powder feeding in direct diode laser deposition for rapid prototyping[J]. Applied surface science, 2005, 247(1): 268-276). For the wire feeding additive manufacturing, the cladding efficiency of the wire feeding additive manufacturing can reach almost 100% under the appropriate process conditions, which can greatly improve the utilization rate of the material. However, the laser absorption rate of the metal wire is affected by many factors, and the affecting factors are more complex. In addition, due to the reflection of the wire, the energy of the laser acting on the wire and melting it is greatly reduced, resulting in low deposition efficiency. By using 316L stainless steel welding wire to implement formation on the stainless steel part, the influence of different process parameters on laser additive manufacturing was studied by Faming Shen et al. The deposition efficiency was about 0.27 kg/(H·kW) (Faming Shen. Characteristics of wire-based laser additive manufacturing for stainless steel[D]. Harbin Institute of Technology. 2015).

How to realize high efficiency laser additive manufacturing and improve energy utilization and formation efficiency is a difficult problem to be solved. Therefore, this field needs a new laser additive manufacturing method that uses the deep laser welding principle and improves the forming efficiency.

SUMMARY

The present disclosure aims to provide a method which can improve the forming efficiency of wire feeding laser additive manufacturing, and solve the problems of high laser energy reflectivity and low formation efficiency in the wire feeding process.

The technical scheme of the disclosure is as follows.

According to one aspect of the present disclosure, there is provided a method for laser additive manufacturing based on keyhole effects. The laser additive manufacturing method includes the following steps.

A welding wire and a laser beam are arranged, at certain angles, at two sides of a normal line of a substrate. A light spot generated by the laser beam is applied on a position of the welding wire that has a certain distance from the substrate. The laser beam produces a deep penetration melting keyhole. The welding wire absorbs most of the energy of the laser beam and is heated and melted in a deep penetration melting mod. The welding wire transits energy to a surface of the substrate to form a melting pool and a cladding layer in a first area. After passing through the welding wire, the laser beam irradiates a second area of the substrate to preheat the second area of the substrate in a thermal conduction mode.

In an embodiment, the method adopts a front wire feeding mode, and the welding wire, the laser beam and a normal line of the substrate are in one plane. An angle between the welding wire and the normal line is a first angle, and an angle between the laser beam and the normal line is a second angle.

In an embodiment, the first angle between the welding wire and the normal line is 5°~30°.

In an embodiment, the second angle between the laser beam and the normal line is 15°~45°.

In an embodiment, the position of the light spot applied on the welding wire is 1-5 mm away from the surface of the workpiece.

According to another aspect of the present disclosure, there is provided a system for laser additive manufacturing based on keyhole effects. The system includes a substrate, a welding wire and a laser beam.

The substrate has a surface suitable for additive manufacturing. The welding wire and the laser beam are placed, at certain angles, at two sides of a normal line of the substrate. A light spot generated by the laser beam acts on the welding wire and produces a deep penetration melting keyhole, such that the welding wire absorbs the energy of the laser beam in the deep penetration melting mode and transits energy to the substrate to form a melting pool 3 and a cladding layer 2 in a first area. After passing through the welding wire, the laser beam irradiates a second area of the substrate to preheat the second area of the substrate in a thermal conduction mode.

In an embodiment, the system adopts a front wire feeding mode, and the welding wire, the laser beam 5 and the normal line of the substrate are in one plane. An angle between the welding wire and the normal line is a first angle, and an angle between the laser beam and the normal line is a second angle.

In an embodiment, the first angle between the welding wire and the normal line is 5°~30°.

In an embodiment, the second angle between the laser beam and the normal line is 15°~45°.

In an embodiment, the light spot acting on the welding wire is 1~5 mm away from the surface of the substrate.

In accordance with the abovementioned, the present disclosure may provide one or more technical advantages.

In one aspect, by heating and melting the welding wire in the deep penetration melting mode, the melting rate of the welding wire is greatly increased, and the formation efficiency is greatly improved.

In another aspect, by heating and melting a workpiece in the thermal conduction mode, the occurrence of defects, such as air hole and the like, can be effectively avoided.

1 substrate, 2 cladding layer, 3 melting pool, 4 deep penetration melting keyhole, 5 laser beam, 6 guide nozzle, 7 welding wire, 8 preheating area.

DETAILED DESCRIPTION OF EMBODIMENTS OF THE DISCLOSURE

Several preferred embodiments of the present disclosure will be described in detail in conjunction with the accompanying drawings as follows, however, the present disclosure is intended to encompass any substitutions, modifications, equivalents, etc., made thereto without departing from the spirit and scope of the present disclosure. In order to provide those skilled in the art with thorough understanding of the present disclosure, particular details will be described below in the exemplary embodiments of the present disclosure, although those skilled in the art can understand the present disclosure without the description of these details.

Figure 1:
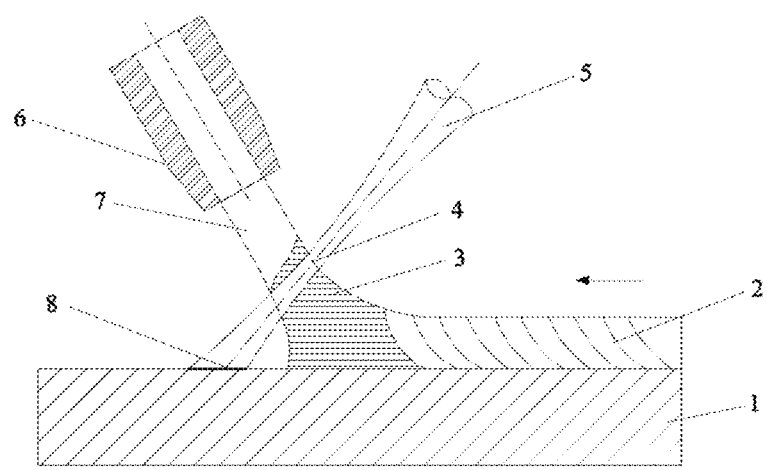
FIG. 1 is a schematic diagram of a method of laser additive manufacturing based on keyhole effect.

As illustrated in FIG. 1, according to the present disclosure, a system for a method for wire feeding additive manufacturing based on the keyhole effects is provided. The illustrated system includes a substrate 1. A welding wire 7 and a laser beam 5 are arranged at two different sides of a normal line of the substrate 1. The welding wire 7 is arranged with a certain angle with the normal line of the substrate 1. The laser beam is also arranged with a certain angle with the normal line of the substrate 1. The laser beam 5 acts on the welding wire 7 and produces a deep penetration melting keyhole 4 on the welding wire 7. The welding wire 7 absorbs the energy of the laser beam 5 in a deep penetration melting mode and transits energy to the substrate 1 to form a melting pool 3 and a cladding layer 2. After passing through the welding wire 7, the laser beam 5 irradiates the surface of the substrate 1 to preheat a workpiece in a thermal conduction mode.

The substrate 1 in the system is the surface of the workpiece where the additive manufacturing is implemented, and can be made of any suitable metal material.

The welding wire 7 in the system is supplied from the guide nozzle 6, the movement process of the guide nozzle 6 and the wire feeding speed of the welding wire 7 can be controlled in any applicable way, such as using a special or general control system (not shown in the figure).

The welding wire 7 in the system is made of material suitable for the material of the substrate 1. In an optional embodiment, the welding wire 7 is made of the same material as the substrate 1 to form a cladding layer 2 with the same material as the substrate 1.

The laser beam 5 in the system can be generated by any applicable laser. The laser beam 5 is guided to a position above the substrate 1 through a light guiding system such as an optical fiber, and generates a light spot in a set area through an optical focusing system. The power, focusing position and other parameters of the laser beam 5 can be set by using the relevant control device (not shown in the figure), so that the laser, the light guiding system and the optical focusing system can be controlled. The parameters are set in such a manner that required heating effect is provided at a required position of the welding wire 7.

The welding wire 7 and the laser beam 5 in the system are configured in a front wire feeding mode. That is, the welding wire is fed in front of the normal line along a system scanning direction, and the laser beam 5 is on the other side of the normal line. An included angle between the welding wire 7 and the normal line is a first angle, and an included angle between the laser beam 5 and the normal line is a second angle. The welding wire 7 and the laser beam 5 may share the same three-dimensional moving device, or each of the welding wire 7 and the laser beam 5 is equipped with a three-dimensional moving device. Each of the welding wire 7 and the laser beam 5 moves according to a predetermined trajectory, so as to form a cladding layer 2 with a predetermined shape on the substrate 1.

In an optional embodiment, the first angle between the welding wire 7 and the normal line is 5°~30°. In an optional embodiment, the second angle between the laser beam 5 and the normal line is 5°~30°. The light spot of the laser beam 5 focused on the welding wire is 1-5 mm away from the substrate 1.

The term "keyhole effect" mentioned here refers to that the laser beam acts on the welding wire with a high power density, so that the welding wire is heated and melted to a temperature above the boiling point, resulting in violent evaporation of the material, a deep penetration melting keyhole is formed on the welding wire because of the vapor pressure, and the laser beam can pass through the welding wire through the keyhole.

The term "deep penetration melting mode" mentioned here refers to that the laser beam heats the welding wire with a high power, the welding wire absorbs the heat of the laser beam and then melts deeply, thus forming a deep penetration melting keyhole on the welding wire, and the laser beam can pass through the welding wire via the deep penetration melting keyhole.

The term "thermal conduction mode" mentioned here refers to that the laser beam heats the surface of the substrate with a small power, the surface of the substrate only melts in a limited depth after absorbing the heat of the laser beam, and transmits heat to the surrounding of the laser irradiation position and the interior of the substrate through heat conduction.

The method and system of wire feeding laser additive manufacturing based on the keyhole effect will be further described in combination with specific embodiments.

Figure 2:
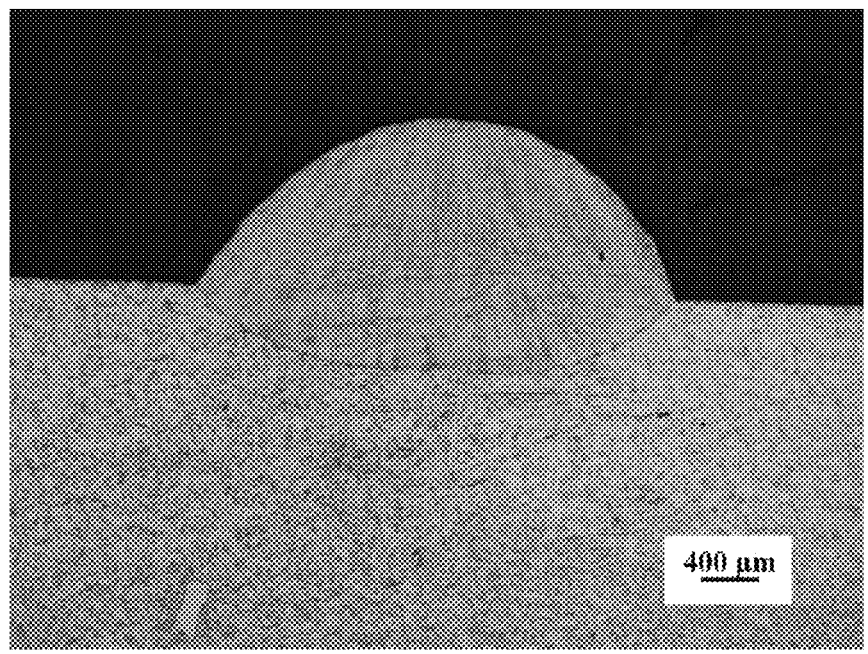
FIG. 2 is an optics microscope photo of a manufactured part in an embodiment one.
Figure 3:
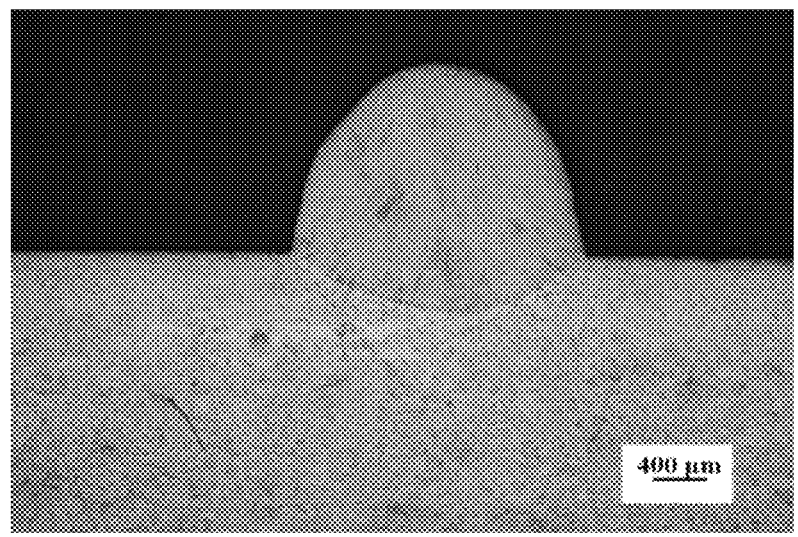
FIG. 3 is an optics microscope photo of a manufactured part in an embodiment two.

Embodiment one: The basic principle of the embodiment of this disclosure is shown in FIG. 1, and will not be repeated here. In this embodiment, the YLS-6000 fiber laser of IPG company is used. The welding wire is made of 316L stainless steel with a diameter of 1.2 mm. A 200 mm focusing mirror is used. A front wire feeding mode is adopted. The laser beam and the normal line of the workpiece are in the same plane. The angle between the welding wire and the normal line of the workpiece is adjusted to 15°, the angle between the laser beam and the normal line of the workpiece is adjusted to 30°. The position of the light spot acting on the welding wire is 2 mm away from the surface of the workpiece. The shielding gas is Ar, and the gas flow rate is 20 L/min. The process parameters are as follows: laser power is 3 kw, wire feeding speed is 3 m/min, scanning speed is 1.5 m/min. The cross-sectional optics microscope photo of the formed part of embodiment one is shown in FIG. 2. The formed part of this embodiment is in a good state, and the metal deposition efficiency is 0.72 kg/(h·kW), which is about double times of the traditional laser additive manufacturing.

Embodiment two: The basic principle of the embodiment of this disclosure is shown in FIG. 1, and will not be repeated here. In this embodiment, the YLS-6000 fiber laser of IPG company is used. The welding wire is made of 316L stainless steel with a diameter of 1.2 mm. A 200 mm focusing mirror is used. A front wire feeding mode is adopted. The laser beam and the normal line of the workpiece are in the same plane. The angle between the welding wire and the normal line of the workpiece is adjusted to 30°, and the angle between the laser beam and the normal line of the workpiece is adjusted to 30°. The position of the light spot acting on the welding wire is 2 mm away from the surface of the workpiece. The shielding gas is Ar, and the gas flow rate is 20 L/min. The process parameters are as follows: laser power is 3 kw, wire feeding speed is 4 m/min, scanning speed is 1.5 m/min. The cross-sectional optics microscope photo of the formed part of embodiment two is shown in FIG. 2, the formed part is in good state, and the metal deposition efficiency is 0.72 kg/(h·kW), which is about triple times of the traditional laser additive manufacturing.

Figure 4:
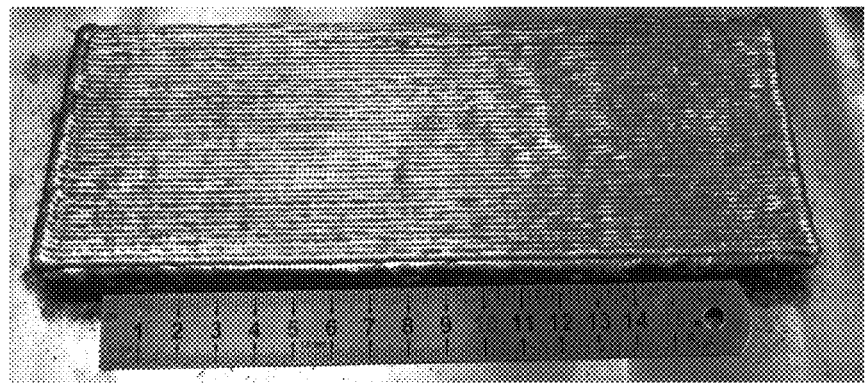
FIG. 4 is an appearance view of a manufactured part in an embodiment three.

Embodiment three: The basic principle of the embodiment of this disclosure is shown in FIG. 1, and will not be repeated here. In this embodiment, the YLS-6000 fiber laser of IPG company is used. The welding wire is made of 316L stainless steel with a diameter of 1.2 mm. A 200 mm focusing mirror is used. A front wire feeding mode is adopted. The laser beam and the normal line of the workpiece are in the same plane. The angle between the welding wire and the normal line of the workpiece is adjusted to 15°, and the angle between the laser beam and the normal line of the workpiece is adjusted to 30°. The position of the light spot acting on the welding wire is 2.5 mm away from the surface of the workpiece. The shielding gas is Ar, and the gas flow rate is 20 L/min. The process parameters are as follows: laser power is 3 kw, wire feeding speed is 4.5 m/min, scanning speed is 1.5 m/min. The appearance of the formed part in embodiment three is shown in FIG. 4.

The above are merely preferred embodiments of the present invention, and those skilled in the art can understand that the present invention is not limited thereto. Without departing from the principle of the present invention, the present invention can also make several improvements and modifications, and these improvements and modifications should also be regarded as within the protection scope of the present invention.

We claim:

1. A method for laser additive manufacturing based on keyhole effects, comprising:
   arranging a welding wire and a laser beam at two sides of a normal line of a substrate respectively;
   applying a light spot of the laser beam on a position of the welding wire above the substrate by a non-zero distance to produce a deep penetration melting keyhole on the position, the welding wire absorbing energy of the laser beam, being heated and melted in a deep penetration welding mode, and the welding wire transiting energy to the substrate to form a melting pool and a cladding layer at a first area of the substrate; and
   after passing through the deep penetration melting keyhole, the laser beam irradiating a second area of the substrate to preheat the second area of the substrate in a thermal conduction mode, the second area being located in front of the normal line along a system scanning direction of the welding wire and the laser beam;
   wherein the second area is located in front of the melting pool and the cladding layer along the system scanning direction, the melting pool and the welding wire are connected, the melting pool is located behind the laser beam along the system scanning direction, and the welding wire is located in front of the laser beam along the system scanning direction;
   wherein the welding wire is fed in front of the normal line along the system scanning direction and the laser beam is on an other side of the normal line from the welding wire, the welding wire and the laser beam are arranged in a cross pattern.

2. The method for laser additive manufacturing based on keyhole effects according to claim 1, wherein the method adopts a front wire feeding mode, and the welding wire, the laser beam and the normal line of the substrate are in one plane, an angle between the welding wire and the normal line is a first angle, and an angle between the laser beam and the normal line is a second angle.

3. The method for laser additive manufacturing based on keyhole effects according to claim 2, wherein the first angle between the welding wire and the normal line is in a range of 5° to 30°.

4. The method for laser additive manufacturing based on keyhole effects according to claim 2, wherein the second angle between the laser beam and the normal line is in a range of 15° to 45°.

5. The method for laser additive manufacturing based on keyhole effects according to claim 1, wherein the position of the welding wire where the light spot is applied is in a range of 1 mm to 5 mm away from a surface of a workpiece.

6. A system for laser additive manufacturing based on keyhole effects, comprising:
   a substrate, having a surface suitable for additive manufacturing; and
   a welding wire and a laser beam, arranged at two sides of a normal line of the substrate respectively,
   wherein the laser beam is applied on a position of the welding wire and produces a deep penetration melting keyhole on the position, the position of the welding wire is above the substrate by a non-zero distance, the welding wire absorbs energy of the laser beam and is heated and melted in a deep penetration melting mode, and the welding wire transits energy to the substrate to form a melting pool and a cladding layer at a first area;
   after passing through the deep penetration melting keyhole, the laser beam irradiates a second area of the substrate to preheat the second area of the substrate in a thermal conduction mode, the second area being located in front of the normal line along a system scanning direction of the welding wire and the laser beam;
   wherein the second area is located in front of the melting pool and the cladding layer along the system scanning direction, the melting pool and the welding wire are connected, the melting pool is located behind the laser beam along the system scanning direction, and the welding wire is located in front of the laser beam along the system scanning direction;
   wherein the welding wire is fed in front of the normal line along the system scanning direction and the laser beam is on an other side of the normal line from the welding wire, the welding wire and the laser beam are arranged in a cross pattern.

7. The system for laser additive manufacturing based on keyhole effects according to claim 6, wherein the system adopts a front wire feeding mode, and the welding wire, the laser beam and the normal line of the substrate are in one plane, an angle between the welding wire and the normal line is a first angle, and an angle between the laser beam and the normal line is a second angle.

8. The system for laser additive manufacturing based on keyhole effects according to claim 7, wherein the first angle between the welding wire and the normal line is in a range of 5° to 30°.

9. The system for laser additive manufacturing based on keyhole effects according to claim 7, wherein the second angle between the laser beam and the normal line is in a range of 15° to 45°.

10. The system for laser additive manufacturing based on keyhole effects according to claim 6, wherein a light spot is applied on a position of the welding wire that is in a range of 1 mm to 5 mm away from a surface of a workpiece.

11. The method for laser additive manufacturing based on keyhole effects according to claim 1, wherein the cladding layer and the second area are located on two sides of a normal line of the substrate.

12. The system for laser additive manufacturing based on keyhole effects according to claim 6, wherein the cladding layer and the second area are located on two sides of a normal line of the substrate.

\* \* \* \* \*